H. LOGEL.
SAW FILING DEVICE.
APPLICATION FILED AUG. 4, 1920.
1,385,014.
Patented July 19, 1921.
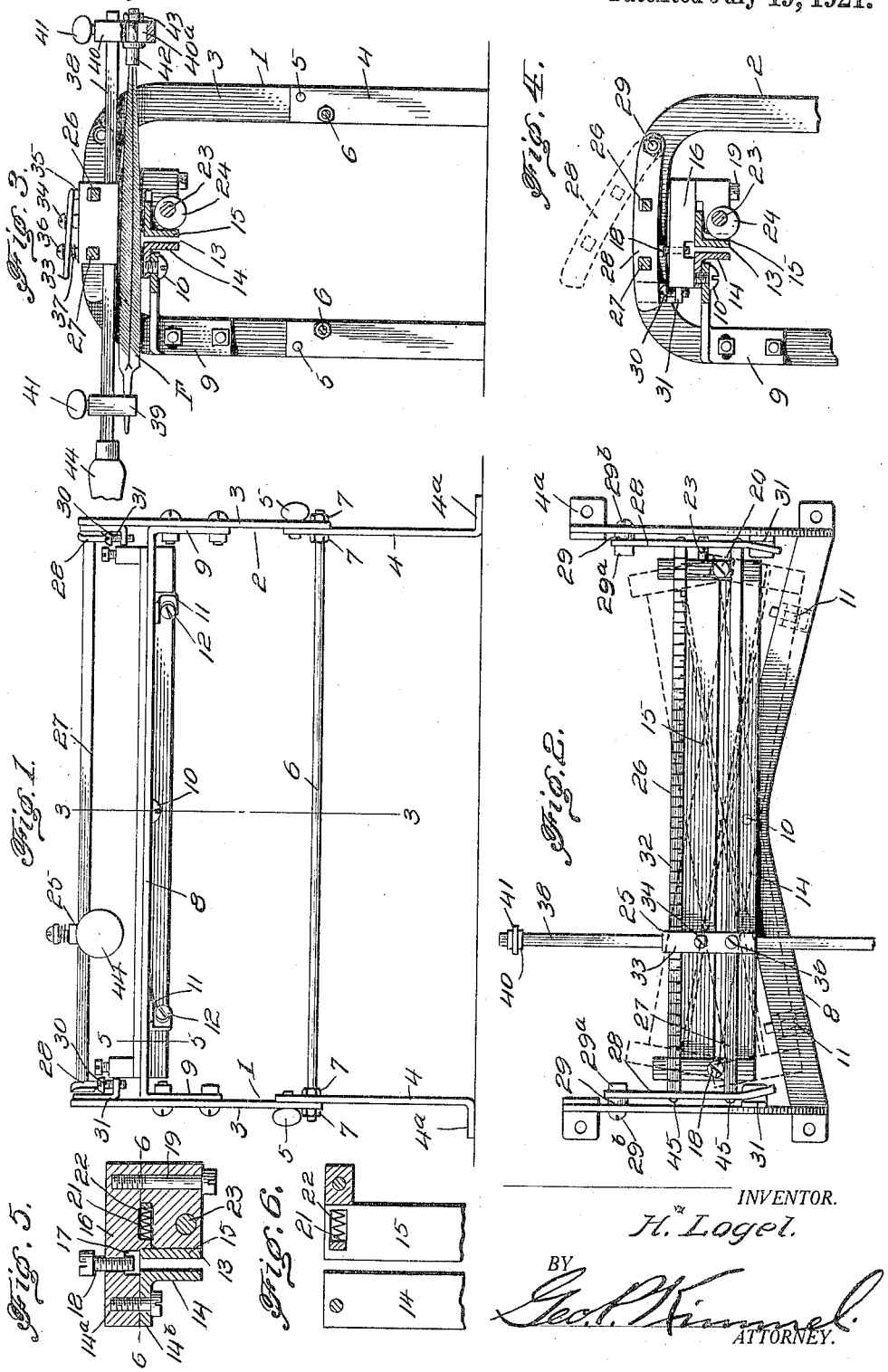
INVENTOR.
H. Logel.
BY
Geo. P. Kimmel.
ATTORNEY.

UNITED STATES PATENT OFFICE.

HENRY LOGEL, OF MUSKEGON, MICHIGAN.

SAW-FILING DEVICE.

1,385,014.  Specification of Letters Patent.  Patented July 19, 1921.

Application filed August 4, 1920. Serial No. 401,112.

*To all whom it may concern:*

Be it known that I, HENRY LOGEL, a citizen of the United States, residing at Muskegon, in the county of Muskegon and State of Michigan, have invented certain new and useful Improvements in Saw-Filing Devices, of which the following is a specification.

This invention relates to saw filing machines and the object thereof is to provide simple and efficient means for accurately filing hand saws which may be operated as well by an amateur as by an expert.

Another object is to provide a machine of this character which is automatic in accuracy after it has been properly set for the saw in connection with which it is to be used.

Another object is to provide simple means for quickly, closely and accurately making adjustments of pitch, depth and angles to provide for the accommodation of the file to meet variations in the teeth of different saws and whereby the saw teeth may be exactly and uniformly filed.

Another object is to provide a machine of this character having a frame suitably mounted to slidably support a carriage upon which the file holder is carried, means being provided whereby the carriage may be adjusted in various positions to position the file properly relatively to the saw.

Another object of the invention is to provide a saw filing machine having means for accurately determining the position to be assumed by the file carriage in moving longitudinally of the saw blade, in order that the file may be shifted along the blade at uniform distances to accurately space it in relation to the saw teeth.

With these and other objects in view, the invention consists in certain novel features of construction as hereinafter shown and described and then specifically pointed out in the claims and in the drawings illustrative of the preferred embodiment of the invention.

In the accompanying drawings:

Figure 1 represents a side elevation of the saw filing machine constructed in accordance with this invention.

Fig. 2 is a top plan view thereof, with a part of the file holder broken off.

Fig. 3 is a transverse section taken on the line 3—3 of Fig. 1.

Fig. 4 is a detail sectional view.

Fig. 5 is a detail sectional view taken on the line 5—5 of Fig. 1, and

Fig. 6 is a detail horizontal section taken on the line 6—6 of Fig. 5.

In the embodiment illustrated the machine constituting this invention includes a supporting frame composed of inverted U-shaped end members 1 and 2, each of which is made in sections 3 and 4 adjustably connected by thumb screws 5. These members 1 and 2 are provided at the free ends of their legs with outturned apertured laterally extending feet 4ª to provide for the attachment of the frame to a supporting structure.

Connecting rods 6 unite the legs of the two members 1 and 2 preferably extending through the meeting ends of the sections 3 and 4 thereof and are secured in adjusted position by lock nuts 7.

The upper ends of the members 1 and 2 at one side thereof are connected by a substantially V-shaped bar 8 having downturned rightangularly disposed ends 9 secured by bolts to the inner faces of the members 1 and 2. This bar 8 has mounted at the apex thereof a horizontally swinging saw clamp 13, its pivotal connection with the bar 8 being shown at 10.

The bar 8 carries on its lower face near its opposite ends two L-shaped brackets 11 one arm of which depends below said bar and carries an adjustably mounted screw 12 designed to operate as a stop for limiting the swinging movement of the saw clamp in opposite directions as will be hereinafter more fully described.

The saw clamp 13 is composed of two angle irons 14 and 15, said irons being L-shape in cross section with one flange of each extending downwardly and the other arranged horizontally, the depending flanges being designed to clamp between them the saw blade to be filed. These clamping jaws 14 and 15 are carried at their opposite ends by heads as 16 shown in detail in Fig. 5, the jaw 14 being secured by screws as 14ª which extend through the flange 14ᵇ of the jaw 14 and engage the head 16 whereby said jaw 14 is fixedly connected to the heads at the opposite ends of the frame of the machine. The horizontal flange 14ᵇ of this jaw 14 is pivotally connected at 10 to the bend of bar 8 as is shown clearly in Fig. 2.

The jaw 15 is mounted to move toward and away from jaw 14 being normally forced away from said jaw by coiled springs 22 mounted in recesses 21 in the blocks 16, one end of each spring bearing against one wall of the recess 21 and the other against a portion of the horizontal flange of the jaw 15. As shown these heads 16 are made in sections connected by bolts 19 as is shown clearly in Fig. 5 while adjustably mounted over the space between the jaws 14 and 15 are screws 18 and 20 for regulating the position of the saw teeth relatively to the file as will be hereinafter more fully described.

A rod 23 is rotatably mounted at its opposite ends in the heads 16 and this rod has fixed thereto cams 24 which are designed when turned in one direction to forcibly engage the vertical disposed flange of the jaw 15 and move said jaw toward the jaw 14 and hold it in this position to clampingly secure the saw blade to be filed. Any suitable means may be provided for actuating this rod, one end thereof being here shown projecting beyond the frame and made angular in cross section as indicated at 23ª to receive a key or a crank handle for turning the rod.

From the above description it will be obvious that this saw clamp 13 which is pivotally mounted midway its ends at the center of bar 8 may be swung toward and away from said bar to cause it to engage either one inclined arm or the other of said bar and thus position the clamp at an angle relatively to the file.

A file carriage 25 is mounted to slide on two parallel laterally spaced bars or tracks 26 and 27 mounted at their opposite ends in arms 28 which are pivoted at one end to the cross bars of the U-shaped end members 1 and 2 adjacent the side thereof opposed to that on which bar 8 is mounted. These arms 28 have positioned in the path of their free ends vertically adjustable screws 30 carried by brackets 31 secured to the inner faces of the cross bars of the members 1 and 2 at the sides opposite to that on which said arms are pivoted. The pivoted ends of the arms 28 are held spaced from the members 1 and 2 by spacers 29 mounted on the pivots of said arms which are here shown in the form of bolts extending through the cross bars of the members 1 and 2 and equipped with nuts 29ª, the screws being shown at 29ᵇ.

The bars 26 and 27 on which the file carriage 25 is slidably mounted may one or both be equipped with notches 32 positioned certain distances apart and designed to receive a spring pressed locking dog 35 fulcrumed at 34 on the carriage 25 the engaging end or toe of said dog being held downward in operative position by means of a coiled spring 37 arranged under one end of the body 33 of the dog around a screw 36 which extends through said dog and engages the carriage as is shown clearly in Fig. 3.

The file holder proper is constructed in the form of a bar 38 mounted to slide in the carriage 25 in a plane at right angles to the bars 26 and 27 on which said carriage is mounted. This bar 38 has adjustably mounted at its opposite ends file supporting castings 39 and 40 held in adjusted position on the bar by thumb screws 41. The casting 39 which is here shown positioned adjacent the handle 44 of bar 38 has an aperture extending transversely therethrough parallel with the bar 38 and which is designed to receive one end of the file F the other end of said file being mounted in a bearing or sleeve 42 carried by the casting 40 and which is locked in adjusted position in a slot 40ª in said casting by lock nuts 43.

From the above description it will be obvious that the file carrying bar 38 is mounted to reciprocate in the carriage 25 to adapt it for use on the teeth of the saw blade which is clampingly held between the jaws of the clamp 13, the position of said blade relatively to the file being controlled by swinging the clamp on its pivot 10 so that the teeth of the blade may be first filed on one side and then on the other by swinging the clamp from one position to the other, its movement being limited by the screws 12 as above described. The carriage 25 is locked in adjusted position on the bars 26 and 27 by engagement of the nose 35 of the dog with one of the notches in bar 26. This bar 26 is here shown rectangular in transverse section and each face thereof is notched, the notches on the several faces being positioned different distances apart to adapt the device for use with saws, the teeth of which are spaced varying distances. It is of course understood that the notched bar 26 may have the proper face presented for engagement by the dog 35 by removing it from the carriage and positioning the face desired to be used for engagement with the dog. This adjustment of this bar is accomplished owing to the fact that the ends thereof are supported in the arms 28 by means of screws 45 which pass through the arms and enter threaded sockets in the ends of the bar, bar 27 being similarly mounted.

In the use of this machine the saw blade to be filed is inserted between the jaws 14 and 15, the cams 24 having first been turned to permit the jaw 14 to move outward sufficiently to permit the insertion of said blade and after the blade has been properly positioned between the jaws, the depth of the insertion being controlled by the adjustment of the screws 18 and 20, the cams are forcibly engaged with jaw 15 to move it toward jaw 15 and lock it in this position thereby securely clamping the saw blade between the jaws. After the blade has been so positioned the clamp 13 may be moved horizontally to dispose the blade at the desired angle relatively to the file F according to the side of the teeth which it is desired to file. The carriage 25 is then adjusted on the bars 26 and 27 to position the file F over the teeth to be filed. The file holder is then reciprocated in the carriage 25 by grasping the handle 44 and moving the bar 38 back and forth in the carriage. After this tooth has been properly filed, the carriage 25 is moved up a notch on the bar 26 and locked by the dog 35 in this position and the operation above described is repeated. This operation is continued until all of the teeth of the saw blade have been filed on one side. The clamp is then swung in the opposite direction and the filing of the teeth on the other side is then accomplished.

From the above description it will be seen that this saw filing machine while very simple in construction and easily operated and adjusted will yet effectively file the teeth of different kinds of saws and which may be done by an amateur equally as well as an expert.

The preferred embodiment of the invention is disclosed in the drawings and set forth in the specification, but it will be understood that any modifications within the scope of the claims may be made in the construction without departing from the principle of the invention or sacrificing any of its advantages.

What I claim is:

1. In a saw filing machine, a supporting frame, a file carriage mounted for longitudinal adjustment on said frame, a file holder mounted to reciprocate in said carriage transversely of the frame, and a saw clamp mounted on said frame below said carriage to swing in a horizontal plane to position the saw properly relatively to the file, and means for limiting the swinging movement of said clamp in opposite directions.

2. In a saw filing machine, a supporting frame, a file carriage mounted for longitudinal adjustment on said frame, a file holder mounted to reciprocate in said carriage transversely of the frame, and a saw clamp mounted on said frame below said carriage to swing in a horizontal plane to position the saw properly relatively to the file, and adjustable means for limiting the swinging movement of said clamp in opposite directions to vary the angle of the saw relatively to the file.

3. In a saw filing machine, a supporting frame, a file carriage mounted for longitudinal adjustment on said frame, a spring pressed dog to hold said carriage in adjusted position, a file holder mounted to reciprocate in said carriage transversely of the frame, and a saw clamp mounted on said frame below said carriage to swing in a horizontal plane to position the saw properly relatively to the file, and means for limiting the swinging movement of said clamp in opposite directions.

4. In a saw filing machine, a supporting frame, a file carriage mounted for longitudinal adjustment on said frame, a file holder mounted to reciprocate in said carriage transversely of the frame, and a saw clamp mounted on said frame below said carriage to swing in a horizontal plane to position the saw relatively to the file.

5. In a saw filing machine, a supporting frame, a file carriage mounted for longitudinal adjustment on said frame, a file holder mounted to reciprocate in said carriage transversely of the frame, an obtuse-angled bar mounted on said frame with its angle disposed inwardly and a saw clamp pivoted intermediate its ends on said angle and adapted to engage the bar on opposite sides of its angle when swung in opposite directions to hold the saw at a proper angle relative to the file.

In testimony whereof, I affix my signature hereto.

HENRY LOGEL.